US011176297B2

(12) United States Patent
Boutiller et al.

(10) Patent No.: US 11,176,297 B2
(45) Date of Patent: Nov. 16, 2021

(54) DETECTION AND ISOLATION OF FAULTS TO PREVENT PROPAGATION OF FAULTS IN A RESILIENT SYSTEM

(71) Applicant: ARTERIS, INC., Campbell, CA (US)

(72) Inventors: Alexis Boutiller, San Jose, CA (US); Benoit de Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 16/801,142

(22) Filed: Feb. 25, 2020

(65) Prior Publication Data
US 2020/0193077 A1    Jun. 18, 2020

Related U.S. Application Data

(62) Division of application No. 16/218,485, filed on Dec. 13, 2018, now Pat. No. 10,902,166.

(60) Provisional application No. 62/612,580, filed on Dec. 31, 2017.

(51) Int. Cl.
| | |
|---|---|
| *G06F 30/33* | (2020.01) |
| *G06F 11/07* | (2006.01) |
| *G06F 11/14* | (2006.01) |
| *G06F 11/34* | (2006.01) |
| *G06F 15/78* | (2006.01) |
| *G06F 30/30* | (2020.01) |
| *G06F 30/392* | (2020.01) |
| *G06F 12/0815* | (2016.01) |
| *H04L 12/24* | (2006.01) |
| *G06F 117/02* | (2020.01) |

(52) U.S. Cl.
CPC .......... *G06F 30/33* (2020.01); *G06F 11/0709* (2013.01); *G06F 11/0745* (2013.01); *G06F 11/14* (2013.01); *G06F 11/3485* (2013.01); *G06F 12/0815* (2013.01); *G06F 15/7825* (2013.01); *G06F 30/30* (2020.01); *G06F 30/392* (2020.01); *G06F 2117/02* (2020.01); *H04L 41/0659* (2013.01); *H04L 41/0668* (2013.01)

(58) Field of Classification Search
CPC ........ G06F 30/33; G06F 30/30; G06F 30/392; G06F 11/0709; G06F 11/14; G06F 11/0745; G06F 11/3485; G06F 12/0815; G06F 15/7825; G06F 2117/02; G06F 11/1645; G06F 11/165; G06F 11/1695; G06F 2119/20; G06F 12/0831; H04L 41/0659; H04L 41/0668
See application file for complete search history.

(56) References Cited

U.S. PATENT DOCUMENTS 5,621,694 A * 4/1997 Sakugawa ........... G06F 9/30043
365/230.02
5,790,397 A * 8/1998 Bissett ..................... G06F 11/07
700/2

(Continued)

*Primary Examiner* — Nha T Nguyen
(74) *Attorney, Agent, or Firm* — Dana Legal Services; Jubin Dana

(57) ABSTRACT

A resilient system implementation in a network-on-ship with at least one functional logic unit and at least one duplicated logic unit. A resilient system and method, in accordance with the invention, are disclosed for detecting a fault or an uncorrectable error and isolating the fault. Isolation of the fault prevents further propagation of the fault throughout the system. The resilient system includes isolation logic or an isolation unit that isolates the fault.

9 Claims, 14 Drawing Sheets

(56) References Cited

U.S. PATENT DOCUMENTS

| | | | | |
|---|---|---|---|---|
| 6,252,433 | B1* | 6/2001 | Stecklein | H03K 5/24 |
| | | | | 327/65 |
| 7,734,173 | B2* | 6/2010 | Gilligan | H04L 1/0061 |
| | | | | 398/16 |
| 7,788,567 | B1* | 8/2010 | Whitby-Strevens | G06F 11/10 |
| | | | | 714/752 |
| 9,003,221 | B1* | 4/2015 | Abugharbieh | G01R 31/31725 |
| | | | | 713/503 |
| 9,075,621 | B2* | 7/2015 | Schon | G06F 9/3865 |
| 2005/0078021 | A1* | 4/2005 | Cohen | H03M 5/08 |
| | | | | 341/68 |
| 2005/0184778 | A1* | 8/2005 | Figoli | H03K 7/08 |
| | | | | 327/172 |
| 2005/0246596 | A1* | 11/2005 | Chen | H03K 5/131 |
| | | | | 714/700 |
| 2006/0274737 | A1* | 12/2006 | Liu | H04L 7/043 |
| | | | | 370/389 |
| 2006/0280259 | A1* | 12/2006 | Alon | H04L 1/0033 |
| | | | | 375/295 |
| 2007/0266357 | A1* | 11/2007 | Kimata | G06F 30/3312 |
| | | | | 716/113 |
| 2010/0244918 | A1* | 9/2010 | Moyer | H03K 19/0075 |
| | | | | 327/208 |
| 2011/0043323 | A1* | 2/2011 | Hamasako | G05B 9/03 |
| | | | | 340/3.43 |
| 2012/0179933 | A1* | 7/2012 | Lo | H04L 1/0045 |
| | | | | 714/16 |
| 2014/0095953 | A1* | 4/2014 | Paul | H04L 1/20 |
| | | | | 714/748 |
| 2015/0381317 | A1* | 12/2015 | Chard | H04L 1/0046 |
| | | | | 714/776 |
| 2018/0107537 | A1* | 4/2018 | Darbari | G06F 11/0736 |
| 2019/0272119 | A1* | 9/2019 | Brewer | G06F 9/4881 |

* cited by examiner

DETECTION AND ISOLATION OF FAULTS TO PREVENT PROPAGATION OF FAULTS IN A RESILIENT SYSTEM

CROSS REFERENCE

This application is a divisional application of U.S. Non-Provisional application Ser. No. 16/218,485 titled SYSTEM AND METHOD FOR ISOLATING FAULTS IN A RESILIENT SYSTEM by Benoit de LESCURE and filed on Dec. 13, 2018, the entire disclosure of which is incorporated herein by reference.

FIELD OF THE INVENTION

The invention is in the field of computer systems and, more specifically, to chip design for resilient cache coherent systems.

BACKGROUND

The placement of logical units within the floorplan of a chip is important for fault prevention and detection as well as determining physical separation on the chip. In a resilient system, there are mission critical faults as well as latent faults, for example a permanent fault or a transient fault. Typical solutions for a resilient system involve duplication of all logic units or units. In a resilience system, errors occurring in a network-on-chip (NoC), which includes interconnects or transport networks, should not propagate to the rest of the system. Preventing propagation of the error or fault avoids the need to reset the whole system after detecting an uncorrectable error. Currently know approaches are not efficient. For example, some approaches use timeout errors at targets or slaves to allow recovery after isolation of a network interface unit (NIU) located the edge or boundary of the NoC; then a system reset. However, a timeout at a master or initiator does not allow recovery. Also, other faults, such as from unit duplication or from Error Correcting Codes, are not properly addressed. Furthermore, the timeout approach requires definition of a power domain boundary to enable the partial reset of the target NIU. Power consumption is determined by the amount of activity within logical units. The amount of activity in logical units can be estimated by simulations and the simulations are used to test the performance.

Since computer processors with caches were first combined into multiprocessor systems there has been a need for cache coherence. More recently cache coherent multiprocessor systems have been implemented in systems-on-chips (SoCs) as well as NoCs. The cache coherent systems in SoCs comprise instances of processor intellectual properties (IPs), memory controller IPs, and cache coherent system IPs connecting the processors and memory controllers. More recently some SoCs integrate other agent IPs having coherent caches, such as graphics processing units, into heterogeneous multiprocessor systems. Such systems comprise a single centralized monolithic cache coherent system IP.

Some of these design and systems are often used in extreme environments or under conditions where the potential for errors are not acceptable or tolerated. For example, these systems may be used in automotive or aviation. As a result, it is necessary to have a system and method that monitors requests and resulting response to determine if an error or fault may have occurred in the process and report the error or fault to a system monitor, such as a safety controller. When the fault occurs, it can propagate through the system.

Therefore, what is needed is a system and a method for detection and isolation of a fault to prevent further propagation through the system.

SUMMARY OF THE INVENTION

A system and method, in accordance with aspects and embodiments of the invention, are disclosed that detect and isolate a fault to prevent further propagation of the fault throughout the system. The invention discloses an isolation unit that isolates the fault in a cache coherent system IP. In accordance with various aspects of the invention, some coherent interconnect units are stamped out in duplicate, such that there is a functional logic unit or functional coherent interconnect unit and a duplicate logic unit or a checker coherent interconnect unit.

BRIEF DESCRIPTION OF THE DRAWINGS

The invention is described in accordance with the aspects and embodiments in the following description with reference to the FIGs., in which like numbers represent the same or similar elements.

DETAILED DESCRIPTION

Figure 1:
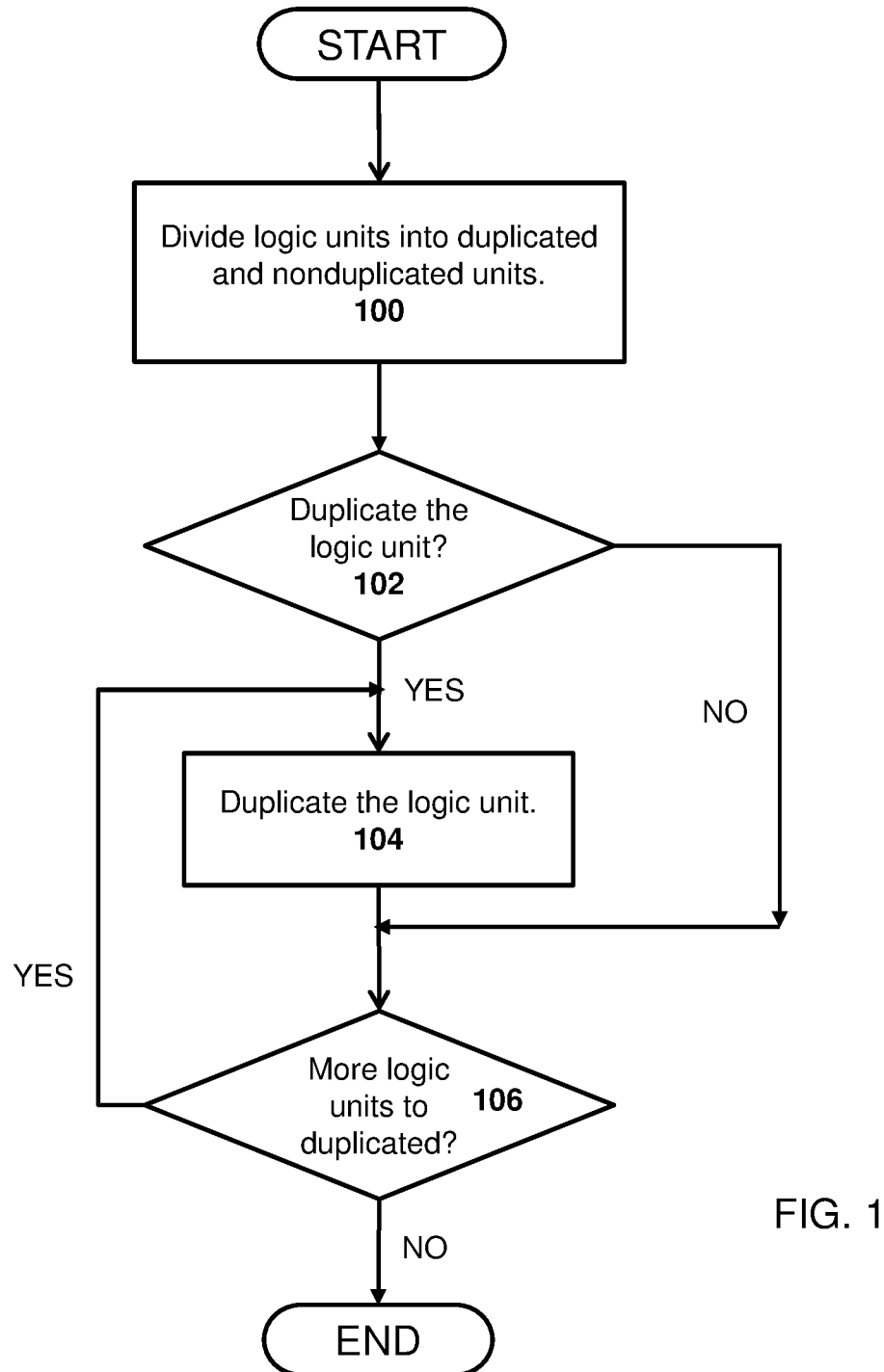
FIG. 1 shows a flow process for selection of duplication of specific logic units in accordance with the various aspects and embodiments of the invention.

To the extent that the terms "including", "includes", "having", "has", "with", or variants thereof are used in either the detailed description and the claims, such terms are intended to be inclusive in a similar manner to the term "comprising".

Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The term "unit" as used herein may refer to one or more circuits, components, registers, processors, software subroutines, or any combination thereof. The separate units communicate with each other, and are logically coupled through a transport network. The terms "logical unit" and "logic unit" as used herein each have their industry standard meaning and may further refer to one or more: circuits, components, registers, processors, software, or any combination thereof.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

In accordance with various aspects and embodiment of the invention a distributed system implementation for cache coherence includes distinct agent interface units, coherency controllers, and memory interface units. The agents send requests in the form of read and write transactions. The system also includes a memory. The memory includes coherent memory regions. The memory is in communication with the agents. The system includes a coherent interconnect in communication with the logic units, memory, and the agents. Thus, using the one interconnect, there are two grouping of logic units in operation, wherein one group includes at least one logic unit that is duplicated (a functional logic unit and its corresponding duplicated logic unit or checker logic unit) and another group with at least one logic unit that is not duplicated. Both of these logic unit group (the duplicated group and the non-duplicated group) use the same interconnect or transport: The system includes a second coherent interconnect in communication with the memory and the agents. The system also includes a comparator for comparing at least two inputs, the comparator is in communication with the two coherent interconnects. The features of the system are outlined and discussed below.

Systems that embody the invention, in accordance with the aspects thereof, are typically designed by describing their functions in hardware description languages. Therefore, the invention is also embodied in such hardware descriptions, and methods of describing systems as such hardware descriptions, but the scope of the invention is not limited thereby. Furthermore, such descriptions can be generated by computer aided design (CAD) software that allows for the configuration of coherent systems and generation of the hardware descriptions in a hardware description language. Therefore, the invention is also embodied in such software.

In the physical design of such SoCs, the centralized cache coherent system Intellectual Property (IP) is a hub of connectivity, which is often referred to as an interconnect. Wires connect transaction interfaces of each agent with the coherent system IP and from that to the memory controller IP.

A cache coherent system performs at least three essential functions:

1. Interfacing to coherent agents—This function includes accepting transaction requests on behalf of a coherent agent and presenting zero, one, or more transaction responses to the coherent agent, as required. In addition, this function presents snoop requests, which operate on the coherent agent's caches to enforce coherence, and accepts snoop responses, which signal the result of the snoop requests.
2. Enforcing coherence—This function includes serializing transaction requests from coherent agents and sending snoop requests to a set of agents to perform coherence operations on copies of data in the agent caches. The set of agents may include any or all coherent agents and may be determined by a directory or snoop filter (or some other filtering function) to minimize the system bandwidth required to perform the coherence operations. This function also includes receiving snoop responses from coherent agents and providing the individual snoop responses or a summary of the snoop responses to a coherent agent as part of a transaction response.
3. Interfacing to the next level of the memory hierarchy—This function includes issuing read and write requests to a memory, such as a DRAM controller or a next-level cache, among other activities.

Performing these functions in a single unit has the benefit of keeping the logic for these related functions close together, but has several major drawbacks. The single unit will be large, and therefore will use a significant amount of silicon area. That will cause congestion in routing of wires around the unit. A single unit will also tend to favor having a single memory or, if multiple memories are used, having them close together to avoid having excessively long wires between the single coherence unit and the memories. Multiple memories, which are typically implemented with interleaved address ranges, are increasingly prevalent.

An aspect of the invention is separation of the functions of a cache coherent system into multiple distinct units, and coupling of them with a transport network. The units communicate by sending and receiving information to each other through the transport network. The units are, fundamentally:

1. Interface Unit (IU)—This unit performs the function of interfacing to agents or to a transport network/transport interconnect. Agents may be fully coherent, IO-coherent, or non-coherent.

2. Coherence controller unit—This unit performs the function of enforcing coherence among the coherent agents for a set of addresses.
3. Memory interface unit—This unit performs the function of interfacing to all or a portion of the next level of the memory hierarchy.
4. Local memory—The memory, for example SRAM, might be used by a unit to store information locally. For instance, a snoop filter will rely on storage by the Coherence Controller unit of information regarding location and sharing status of cache lines. This information might be stored in a Local memory. The Local memory is shared between a functional coherent interconnect unit and a checker coherent interconnect unit. Thus, the Local memory for the interconnects is shared. Thus, local memory and the transport interconnect, which is part of the transport network discussed below, do not need to be duplicated in accordance with some aspects of the invention.

The transport network that couples the units is a means of communication that transfers at least all semantic information necessary, between units, to implement coherence. The transport network, in accordance with some aspects and some embodiments of the invention, is a network-on-chip, though other known means for coupling interfaces on a chip can be used and the scope of the invention is not limited thereby. The transport network provides a separation of the interfaces between the agent interface unit (AIU), network interface unit (NIA), coherence controller, and memory interface units such that they may be physically separated.

A transport network is a component of a system that provides standardized interfaces to other components and functions to receive transaction requests from initiator components, issue a number (zero or more) of consequent requests to target components, receive corresponding responses from target components, and issue responses to initiator components in correspondence to their requests.

In accordance with an embodiment of the invention, the transport network carries non-coherent traffic and the network moves response and requests. A transport network, according to an embodiment of the invention, is packet-based. It supports both read and write requests and issues a response to every request. In an embodiment of the invention, the transport network is message-based. Some or all requests cause no response. In some embodiments, multi-party transactions are used, such that the initiating agent requests go to a coherence controller, which in turn forwards requests to other caching agents, and in some cases a memory, and the agents or memory send responses directly to the initiating requestor.

In some embodiments, the transport network supports multicast requests such that a coherence controller can, as a single request, address some or all of the agents and memory. According to some embodiments the transport network is dedicated to coherence-related communication and in other embodiments at least some parts of the transport network are used to communicate non-coherent traffic.

In some embodiments, the transport network is a network-on-chip with a grid-based mesh or depleted-mesh type of topology. In some embodiments, a network-on-chip has a topology of switches of varied sizes. In some embodiments, the transport network is a crossbar. In some embodiments, a network-on-chip uses virtual channels.

A transport network, according to some embodiments of the invention, is packet-based. It supports both read and write requests and issues a response to every request. In other embodiments, the transport network is message-based. Some or all requests cause no response. In some embodiments, multi-party transactions are used such that initiating agent requests go to a coherence controller, which in turn forwards requests to other caching agents, and in some cases a memory, and the agents or memory send responses directly to the initiating requestor. In some embodiments, the transport network supports multicast requests such that a coherence controller can, as a single request, address some or all of the agents and memory. According to some embodiments the transport network is dedicated to coherence-related communication and in other embodiments at least some parts of the transport network are used to communicate non-coherent traffic. In some embodiments, the transport network is a network-on-chip with a grid-based mesh or depleted-mesh type of topology. In other embodiments, a network-on-chip has a topology of switches of varied sizes. In some embodiments, the transport network is a crossbar. In some embodiments, a network-on-chip uses virtual channels.

According to another aspect of the invention, each type of unit can be implemented as multiple separate instances. A typical system has one agent interface unit associated with each agent, one memory interface unit associated with each of a number of main memory storage elements, and some number of coherence controllers, each responsible for a portion of a memory address space in the system.

In accordance with some aspects of the invention, there does not need to be a fixed relationship between the number of instances of any type and any other type of unit in the system. A typical system has more agent interface units than memory interface units, and a number of coherence controllers that is in a range close to the number of memory interface units. In general, a large number of coherent agents in a system, and therefore a large number of agent interface units implies large transaction and data bandwidth requirements, and therefore requires a large number of coherence controllers to receive and process coherence commands and to issue snoop requests in parallel, and a large number of memory interface units to process memory command transactions in parallel.

Separation of coherence functions into functional units and replication of instances of functional units according to the invention provides for systems of much greater bandwidth, and therefore a larger number of agents and memory interfaces than is efficiently possible with a monolithic unit. Furthermore, some aspects of the cache coherent interconnect are not duplicated. In accordance with the aspects of the invention, the AIU are duplicated so that there is a functional unit and a checker unit. Additionally, the directory and the DMI are duplicated.

In accordance with some aspects of the invention, some embodiments include more than one coherence controller, each coherence controller is responsible for a specific part of the address space, which may be contiguous, non-contiguous or a combination of both. The transport network routes transaction information to a particular coherence controller as directed by sending units. In some embodiments, the choice of coherence controller is done based on address bits above the address bits that index into a cache line, so that the address space is interleaved with such a granularity that sequential cache line transaction requests to the agent interface unit are sent to alternating coherence controllers. Other granularities are possible.

In other embodiments that capture other aspects of the invention, the choice of coherence controller to receive the requests is determined by applying a mathematical function to the address. This function is known as a hashing function.

In accordance with some aspects and some embodiments of the invention, the hashing function causes transactions to be sent to a number of coherence controllers that is not a power of two. The association of individual cache line addresses in the address space to coherence controllers can be any arbitrary assignment; provided there is a one-to-one association of each cache-line address to a specific coherence controller.

According to some aspects and embodiments, coherence controllers perform multiple system functions beyond receiving transaction requests and snoop responses and sending snoop requests, memory transactions, and transaction responses. Some such other functions include snoop filtering, exclusive access monitors, and support for distributed virtual memory transactions.

In accordance with some aspects, embodiments that comprise more than one memory interface unit, each memory interface unit is responsible for a certain part of the address space, which may be contiguous, non-contiguous or a combination of both. For each read or write that requires access to memory, the coherence controller (or in some embodiments, also the agent interface unit) determines which memory interface unit from which to request the cache line. In some embodiments, the function is a simple decoding of address bits above the address bits that index into a cache line, but it can be any function, including ones that support numbers of memory interface units that are not powers of two. The association of individual cache line addresses in the address space to memory interface units can be any arbitrary assignment; provided there is a one-to-one association of individual cache-line addresses to specific memory interface units.

In some embodiments, agent interface units may have a direct path through the transport network to memory interface units for non-coherent transactions. Data from such transactions may be cacheable in an agent, in an agent interface unit, or in a memory interface unit. Such data may also be cacheable in a system cache or memory cache that is external to the cache coherent system.

The approach to chip design of logical and physical separation of the functions of agent interface, coherence controller, and memory interface enables independent scaling of the multiplicity of each function from one chip design to another. That includes both logical scaling and physical scaling. This allows a single semiconductor Intellectual Property (IP) product line of configurable units to serve the needs of different chips within a family, such as a line of mobile application processor chips comprising one model with a single DRAM channel and another model with two DRAM channels or a line of internet communications chips comprising models supporting different numbers of Ethernet ports. Furthermore, such a design approach allows a single semiconductor IP product line of configurable units to serve the needs of chips in a broad range of application spaces, such as simple consumer devices as well as massively parallel multiprocessors.

Referring now to FIG. 1, a process is for selection of duplication of specific logic units in accordance with the various aspects and embodiments of the invention. In accordance with one aspect of the invention, the user defines which logic units are to be duplicated and which logic units will not be duplicated. For those that are not duplicated, the user has an alternative method of performing error or fault detection. For those logic units that are duplicated, a duplicated logic unit or checker logic unit is provided. This allows the user to use both schemes for fault detection (duplication of logic units as well as alternative method) within the same interconnect or transport.

In FIG. 1, the process starts and, at step 100, the logic units are divided into two groups: duplicated logic units and non-duplicated logic units. Each group can have as few as one logic unit. For example, in accordance with one embodiment of the invention, only one logic may be duplicated. In accordance with one embodiment of the invention more than one logic unit may be duplicated. At step 102 the process determines if the logic unit is to be duplicated. If so, then at step 104 the logic unit or the functional logic unit is duplicated and has a corresponding duplicate logic unit or checker logic unit. At step 106, the system or process determines if there are additional logic units to duplicate. If so, then the process continues to step 104. If not, then the process ends resulting in a group of duplicated logic units and a group of non-duplicated logic units, which in accordance with some aspects of the invention, communicate through the same transport network or interconnect.

Figure 2:
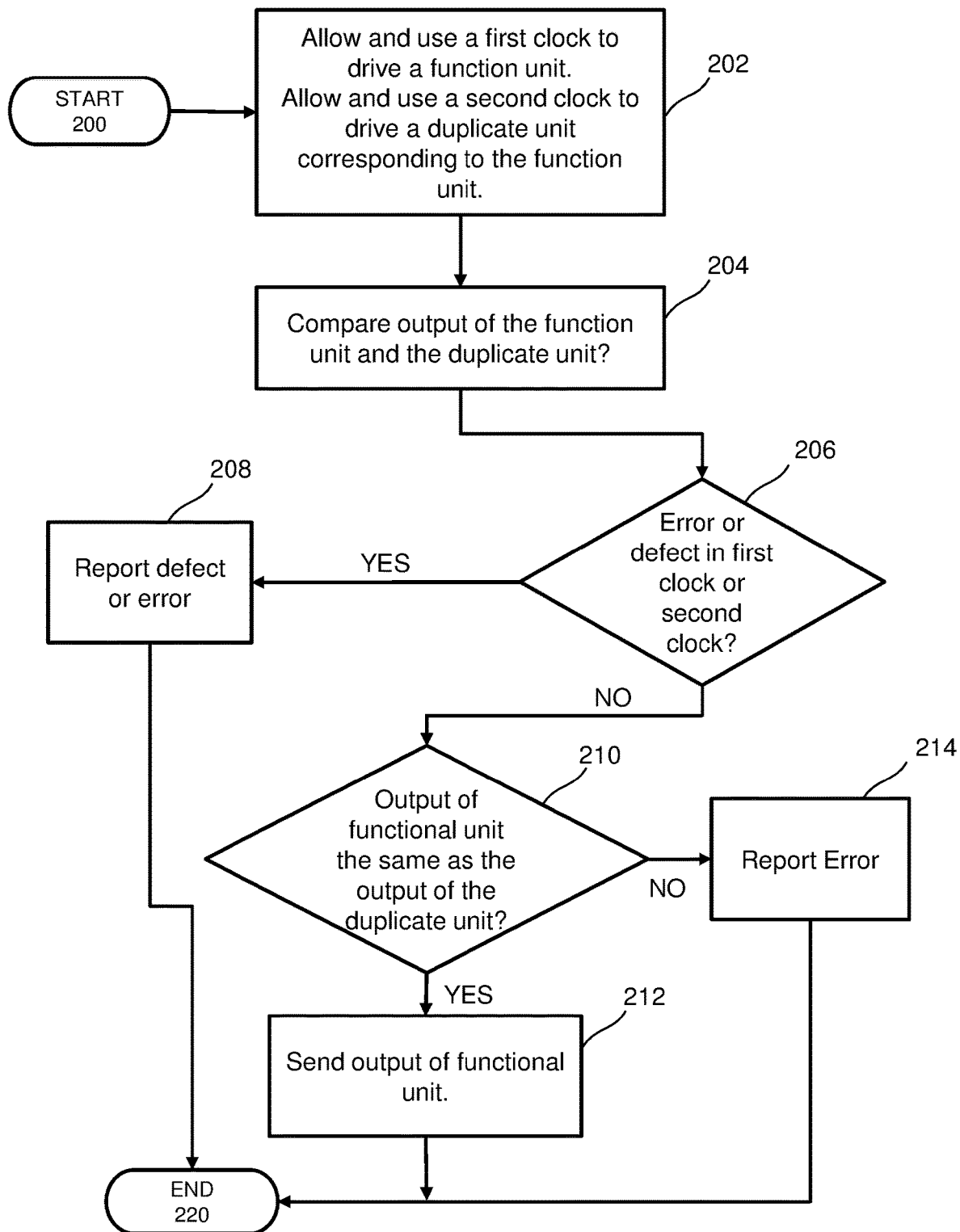
FIG. 2 shows a flow process for providing two clock trees in accordance with the various aspects and embodiments of the invention.

Referring now to FIG. 2, a process 200 is shown for providing two clock trees or clock paths, one path driving the functional logic unit and one path driving the duplicate logic unit or checker logic unit. At step 202, the system allows the user to define a first clock path or tree to drive a function logic unit. The system also allows the user to define a second clock path or tree to drive the corresponding duplicate logic unit or checker unit. Thus, there are two different clock paths, with the same clock domain, driving the functional logic unit and its corresponding duplicate logic unit. In this way, defects or faults in one clock tree or path are not duplicated between the functional logic unit and the duplicate logic unit, in accordance with the various aspects and embodiments of the invention.

At step 204, the system compares the output of the functional logic unit with the output of the duplicate logic unit to determine if there is an error that is related to the functional logic unit output compared to the duplicated logic unit output. The system monitors the clock trees or clock paths and, at step 206, determine if there is an error or defect in either of the clock paths. If so, then the system reports and records the error at step at 208. If there is no defect or error, then at step 210 the result of the comparison of the output of the function logic unit and the output of the duplicate logic unit is determined. If the output of the functional logic unit is the same as the output of the duplicate logic unit, then the system sends the output of the functional unit at step 212 and the process ends. If at step 210 the output of the functional logic unit is not the same as the output of the duplicate logic unit, then the system reports the error at step 214 and the process ends at 220. Using one aspect of the invention, the system can provide a high degree of reliability that ensures defects in clock trees are not duplicated between the functional logic unit and its corresponding checker logic unit or duplicate logic unit.

Figure 3:
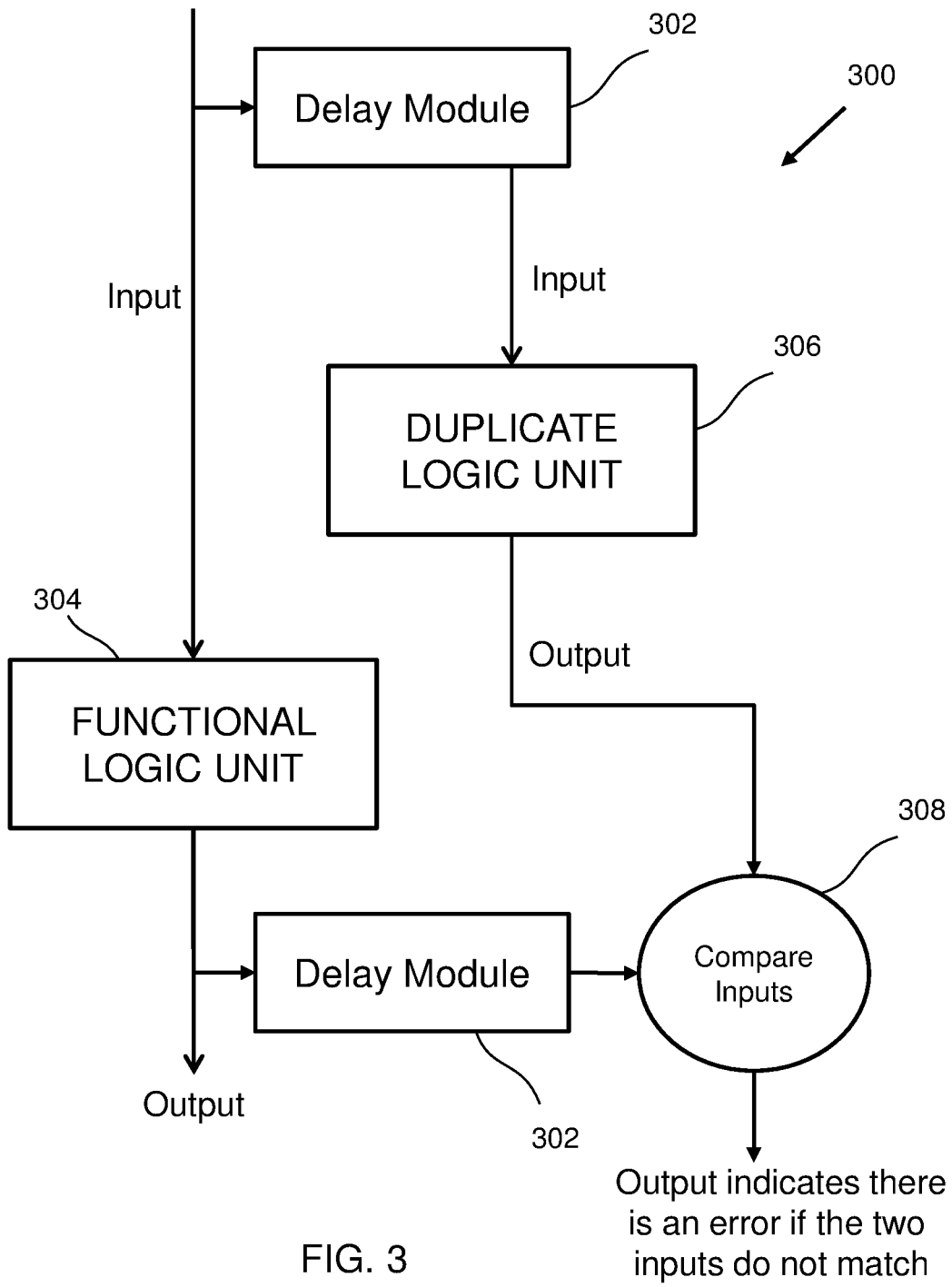
FIG. 3 shows a block diagram for delays in accordance with the various aspects and embodiments of the invention

Referring now to FIG. 3, an embodiment 300 of the invention is shown that includes delay modules or units 302, a function logic unit 304, a corresponding duplicate logic unit 306 and a comparator module or unit 308. The delay modules 302, in accordance with the aspects of this embodiment, have a predefined or predetermined delay value. The delay modules 302 introduces a delay between the time data reaches the functional logic unit 304 and the same data reaches the duplicate logic unit 306. The data is inputted at functional logic unit 304. The data, after being delayed by the delay module 302, is inputted to the duplicate logic unit 306. The output of the functional logic unit 304 passes through the delay module 302 before being inputted to the comparator unit 308. The output of the duplicate logic unit 306 is sent directly to the comparator unit 308. As noted in greater details below, if the outputs of the functional logic unit 304 and the duplicate logic unit 306 do not match, then the comparator unit 308 sends a "fault" signal that indicates an error has occurred. In accordance with one aspect of the invention, errors associated with the functional logic unit 304 are considered mission critical errors. In accordance with one aspect of the invention, errors associated with the duplicate logic unit 306 are considered latent errors.

Figure 4:
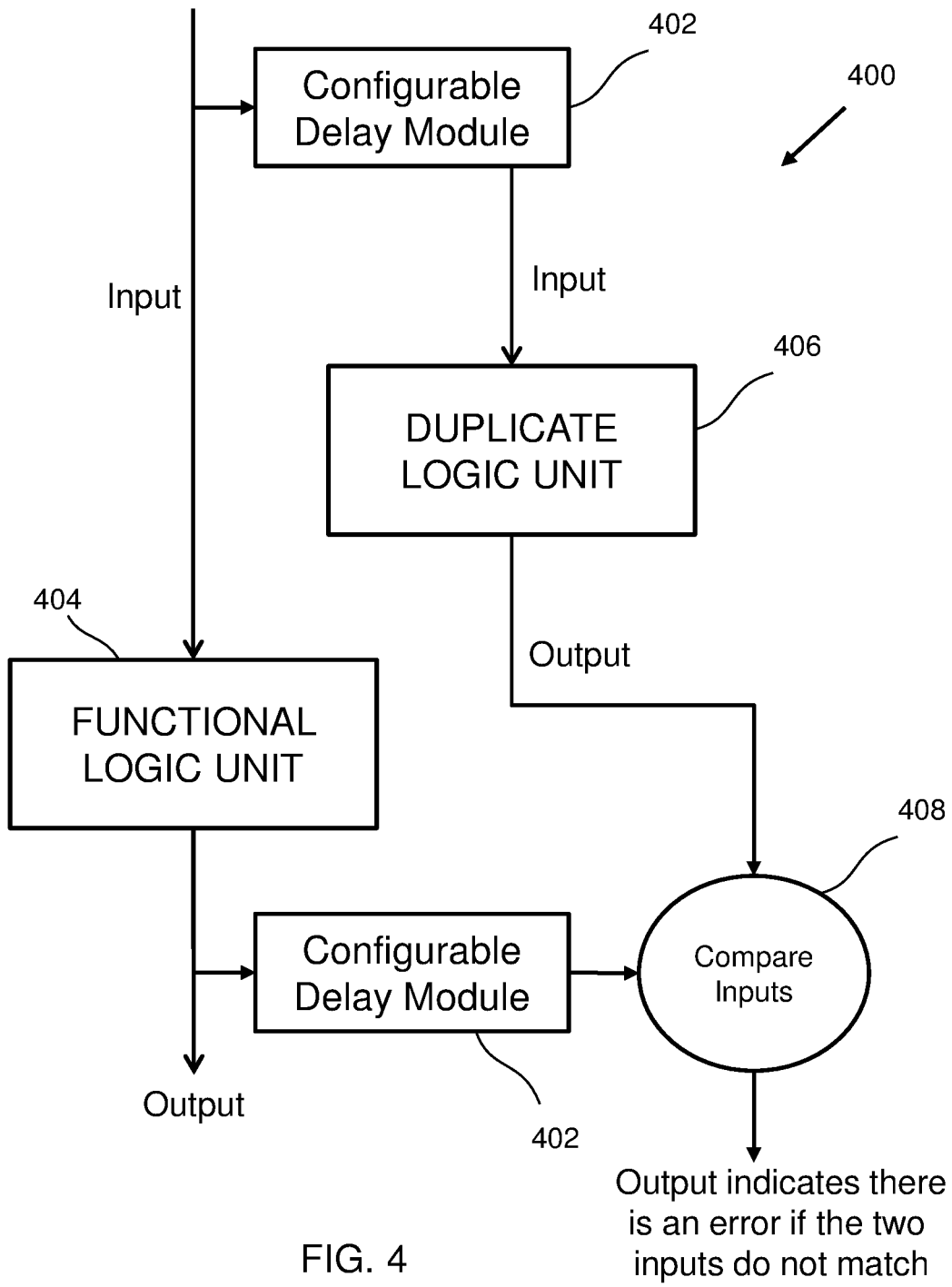
FIG. 4 shows a block diagram for configurable delays in accordance with the various aspects and embodiments of the invention.

Referring now to FIG. 4, an embodiment 400 of the invention is shown and includes configurable delay modules or units 402, functional logic unit 404, duplicate logic unit 406, and a comparator module or unit 408. The functional logic unit 404 and the duplicate logic unit 406 perform the same function. One configurable delay unit 402 is before the input of the duplicate logic unit 406. Another configurable delay unit 402 is between the output of the functional logic unit 404 and the comparator 408. The output of the functional logic unit 404 is sent to the comparator unit 408 after passing through the configurable delay unit 402. The output of the duplicate logic unit 406 is sent directly to the comparator unit 408 without any delay being introduced. As noted in greater details below, if the outputs of the functional logic unit 404 and the duplicate logic unit 406 do not match, then the comparator unit 408 sends a signal that indicates an error has occurred. In accordance with one aspect of the invention, errors associated with the functional logic unit 404 are considered mission critical errors. In accordance with one aspect of the invention, errors associated with the duplicate logic unit 406 are considered latent errors.

Figure 5:
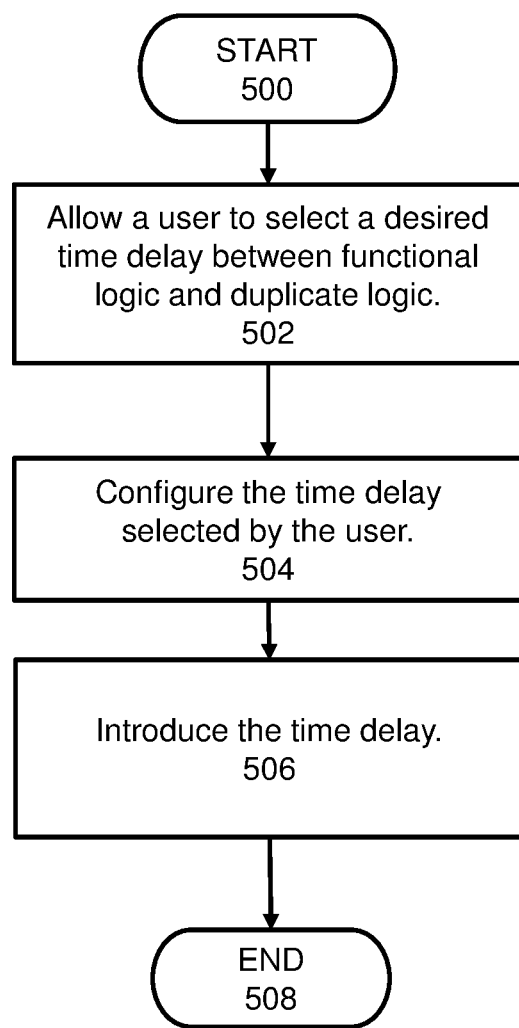
FIG. 5 shows a flow process for configuring or customizing a time delay in accordance with the various aspects and embodiments of the invention.

Referring now to FIG. 5, a process 500 is shown for configuring a time delay in accordance with the various aspects and embodiments of the invention using various techniques, including using register units. At step 502 the user defines or selects a desired time delay between the functional logic unit and the corresponding duplicate logic unit. The delay can be any value and as little as one-half of a clock-cycle to as many clock-cycles desired. The configurable delay can be to address physical separation in accordance with some aspects of the invention. Alternatively, the user may wish to introduce a delay that is a factor (or fraction) or multiple of the frequency of the clock to address unexpected events, system defects, or glitches in the IP so that the delay lasts longer than the glitch to prevent the defect or glitch from lasting long enough to avoid detection. Thus, when the delay is longer than the duration of the glitch, the defect caused by the glitch can be detected. At step 504, the configurable delay unit or module is set up based on the time delay selected. At step 506, the selected time delay is introduced in the data path and the process ends at step 508.

In accordance with one embodiment of the invention, the delay is applied to a single clock tree or path that drives both the functional logic unit and the duplicate logic unit. In accordance with one embodiment of the invention, the delay can be applied to two different clock trees or clock paths. Thus, by having a configurable clock delay, that can be applied to any clock path or clock tree, the physical separation of the functional logic unit and its corresponding duplicate logic unit can be managed and accommodated in the system design and test process.

Figure 6:
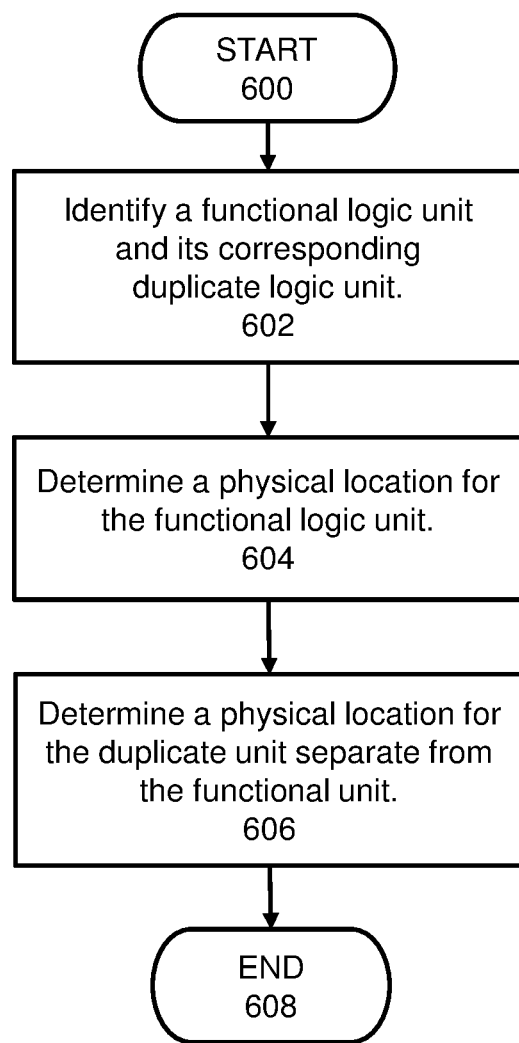
FIG. 6 shows a flow process for physical separation of a functional unit and is corresponding duplicate unit in accordance with the various aspects and embodiments of the invention.

Referring now to FIG. 6, a process 600 is shown for physical separation of a functional unit and its corresponding duplicate unit within a chip floorplan in accordance with the various aspects and embodiments of the invention. At step 602, the system identifies a functional logic unit and its corresponding duplicate logic unit. At step 604, the system determines a physical location for the functional logic unit. At step 606, the system determines a physical location for the duplicate logic unit. This allows the user to configure the system in a way that the functional logic unit and the duplicated logic unit are physically separated in the chip layout or the chip floorplan in such a way that the location, as well as the orientation, of the duplicate logic unit relative to the functional logic unit meet the user's requirements. The process ends at step 608. Thus, within the same IP, some logic units are duplicated as noted above. Of these duplicated logic units (the functional logic unit and its corresponding duplicate being called the duplicate logic unit or the checker logic unit), some are physically separated by a larger distance in the layout of the IP with a different orientation, while some duplicate logic units are located proximate to the functional logic unit. In this way, the user can determine, which of the logic units are duplicated and which ones are physically separated.

The system can determine the location of each functional logic unit and its corresponding duplicate logic unit and provide the location information for each (within the IP) to the user. In this way, the placement of each logic units, can be provided with each IP for the functional logic unit and its duplicated logic unit. Thus, the two parts of an initiator (the functional and duplicate) and the two parts of the target (functional and duplicate), for the corresponding initiator, can be identified with the IP. Thus, the system, in accordance with the various aspects of the invention, can provide or generate the location information independently for each part of each initiator (as well as the target) so that the location of the functional logic unit and the duplicated logic unit for the initiator function (the initiator's two parts) can be identified in the generated RTL for the HDL for the user, given that each RTL is unique because of the customizable IP. This allows the user to know specifically, within the RTL, which logic units are duplicated and the location of each functional logic unit and the location of the corresponding duplicate logic unit.

The RTL that is generated includes specific information about each functional logic unit and its corresponding duplicate logic unit. Accordingly, a configurable HDL and the customizable are used to generate the Verilog RTL.

Figure 7:
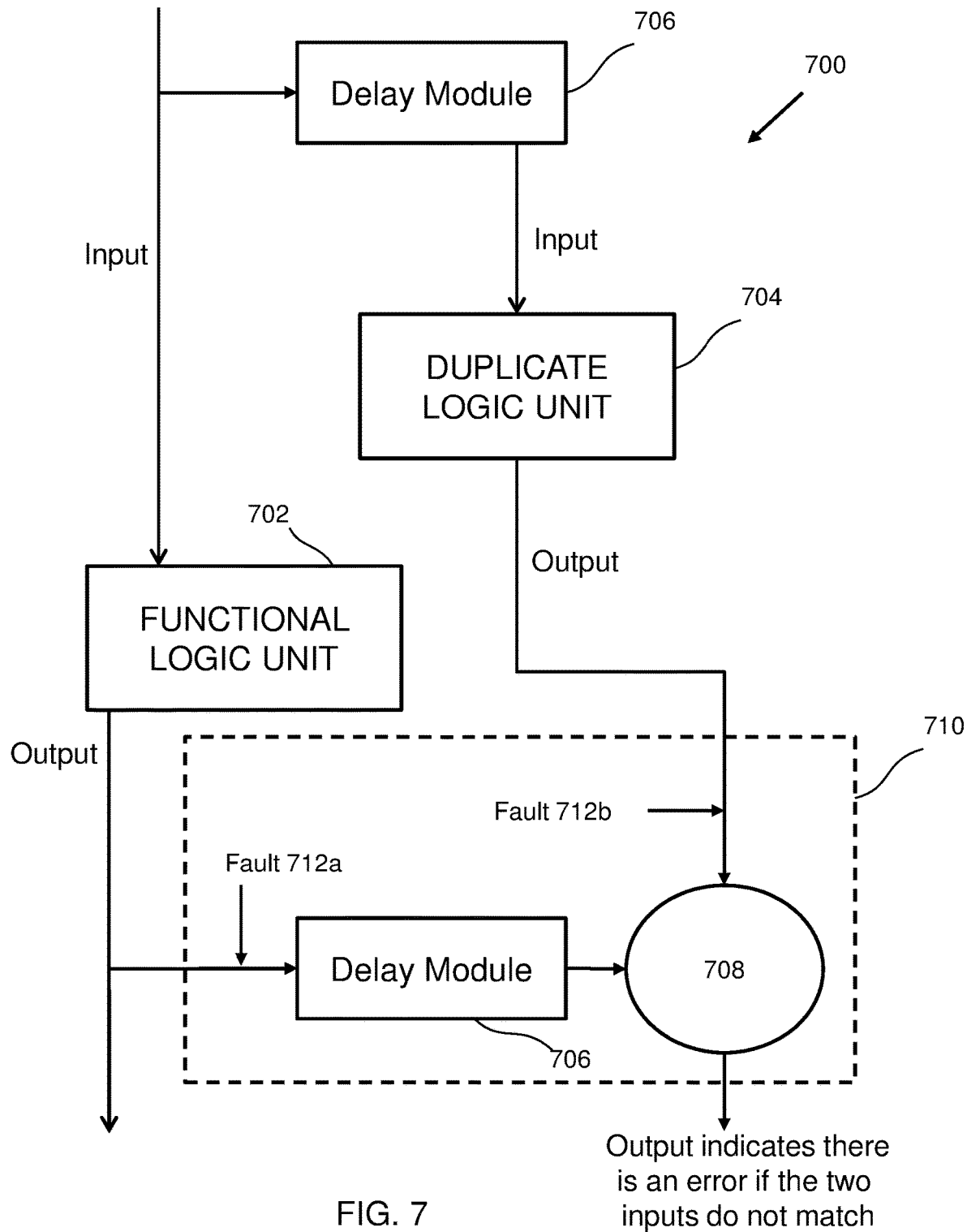
FIG. 7 shows a block diagram of for fault injection unit in accordance with the various aspects and embodiments of the invention.

Referring now to FIG. 7, a system 700 is shown. The system 700 includes functional logic unit 702 and a corresponding duplicate logic unit 704. The system 700 also includes delay modules 706, which operate to create a delay between the input to the functional logic unit 702 and the input to the duplicate logic unit 704. The same delay is introduced between the output of the functional logic unit 702 and a comparator unit 708. The system 700 also includes a module 710. The module 710 receives all outputs from the functional logic unit 702 and the duplicate logic unit 704. In accordance with one embodiment, the module 710 is a zero-time module that randomly selects one bit of one output and flips that bit. This randomly selected output with a "flipped bit" is a fault that is injected to the comparator 708. For example, the output with the "flipped bit" can be introduced as fault 712a or fault 712b. Only one fault is introduced, in accordance with an aspect of the invention. In the current example, fault 712a is introduced. Thus, the output from the functional logic unit 702 has a fault 712a and the output from the duplicate logic unit 704 is not altered. These inputs are provided to the comparator 708. It is expected that the comparator 708 will detect the fault and indicate that the two inputs received at the comparator 708 do not match and, hence, there is an error.

In accordance with various aspects and embodiments of the invention, a fault can be injected anywhere within the system 700 and the IP. The faults that are to be injected and verified are compiled in a text file that is read by the system and introduced or injected into the VERILOG RTL to determine if the fault is detected, which confirms system performance when the fault is introduced or injected and an error is detected.

Figure 8:
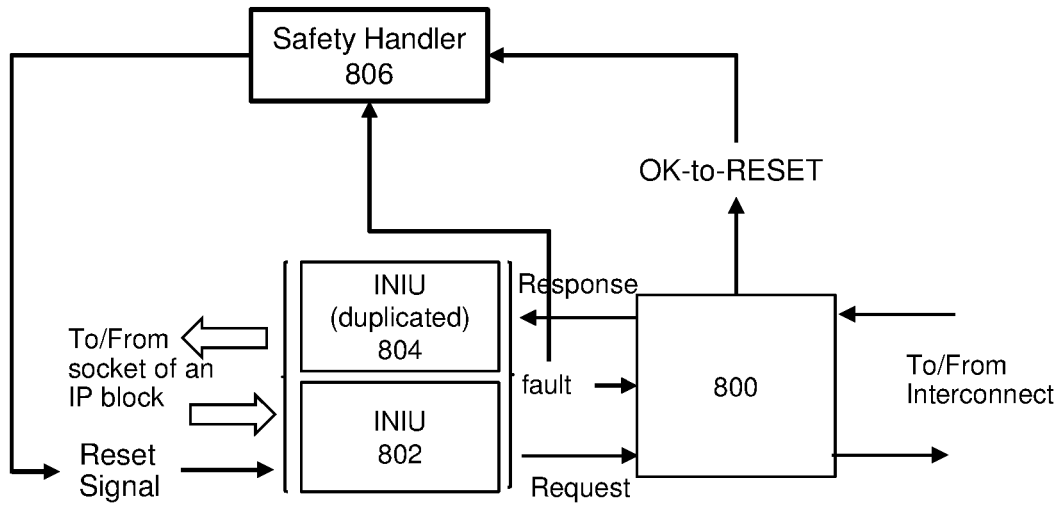
FIG. 8 shows a block diagram showing the network interface of an initiator IP in accordance with the various aspects and embodiments of the invention.

Referring now to FIG. 8, isolation logic of an isolation unit 800 is positioned between an initiator IP, a duplicate initiator IP, and an interconnect or network transport. The isolation unit 800 receives and sends transactions to the initiator IP through an initiator network interface unit INIU 802. The isolation unit 800 receives and sends transactions to a duplicate initiator IP through a duplicate INIU 804. The isolation unit 800 also receives a fault signal, the detection of the fault and generation of the fault signal is outline above for a resilient system. When a fault or an error is detected the fault signal is sent to the isolation unit and a safety handler unit 806. The isolation unit 800, upon receiving the fault signal, isolates the NIUs 802 and 804 and the fault to prevent propagation of the fault throughout the system. In isolation mode, the isolation unit 800 handles the fault or corrupted data packets. Once the isolation unit 800 properly terminates or handles the fault, the isolation unit 800 sends an OK-to-RESET signal to the safety handler unit 806. The safety handler unit 806 sends a reset signal to the initiator IP and the duplicate initiator IP, which includes the respective NIU, to reset and resume operation. In accordance with some embodiments, a handshake protocol is used to restart the initiator IP and/or the duplicate initiator IP.

Figure 9:
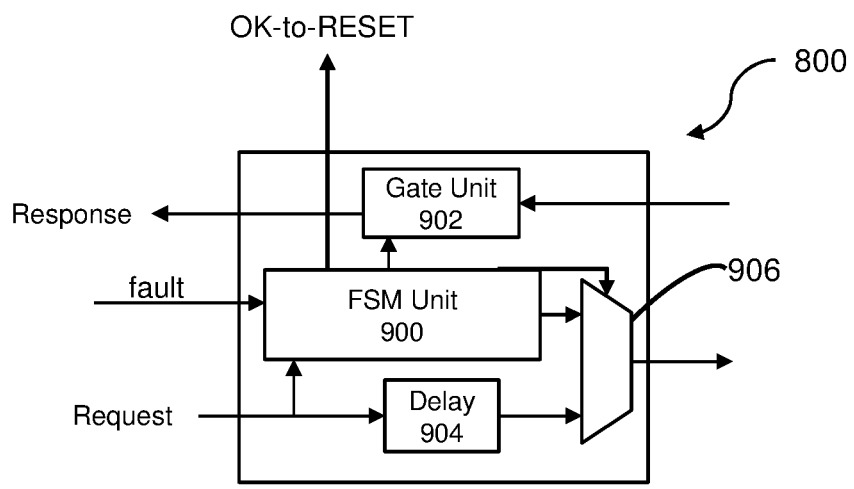
FIG. 9 shows a block diagram showing an isolation unit of FIG. 8 in accordance with the various aspects and embodiments of the invention.

Referring now to FIG. 9, the isolation unit 800 of FIG. 8 is shown in accordance with various aspect and embodiments of the invention. The isolation unit 800 includes a data packet tracking and data termination FLIT State Machine (FSM) unit 900, a gate unit 902, a delay unit 904, and a multiplexing (MUX) unit 906. All incoming requests are delayed by the delay unit 904. The logic of the isolation unit 800 delays request FLITs or data packets until there is certainty that there are no faults for the specific FLIT or data packet being delayed.

The duration of the delay can be any number of clock cycles, from 0 to n. The duration of the delay is the time needed for the fault signal to reach the isolation unit 800. Typically, the duration of the delay is about one clock cycle, in accordance with an aspect of the invention. However, the time delay may be longer or shorter, in accordance with the various aspects and embodiments of the invention and the scope of the invention is not limited by the duration of the time delay. The delay unit 904 includes a buffer for storing data packets while the data packets are delayed. If no fault signal is received within the delay period, then the stored data packets are uncorrupted or healthy data packets that can be passed or sent. The healthy packets are released or sent from the buffer of the delay unit 904 to the MUX 906. At the MUX 906, the packets are processed and sent out from the isolation unit 800. This way the uncorrupted packets are moved or sent. The isolation unit 800 passes uncorrupted data packet because there is no fault.

If a fault signal is received within the delay period at the FSM unit 900, then the isolation unit 800 begins isolation mode because a data packet or FLIT is corrupted. In isolation mode, the isolation unit 800 isolates the NIU. The isolation unit 800 terminates the faulty packet and does not pass it downstream. The FSM unit 900 replaces the terminated packet, which is a faulty packet, with a replacement packet that has the correct FLIT framing. The replacement packet is similar to the faulty packet. The purpose of the replacement packet is to allow other IP of the system to continue operation and avoid a wait state, a suspended state, or a frozen state while looking for the faulty packet, as well as other packets that come after the faulty FLIT or data packet, that is part of a transaction when the faulty packet was terminated, and not allowed to arrive. The replacement packet is sent to the MUX unit 906. Also, the delay unit 904 sends the faulty packet to the MUX 906. The MUX 906 selects the replacement packet to send and prevents passing of the faulty packet based on a signal received from the FSM Unit 900. The replacement packet is sent from the isolation unit 800.

The replacement packet, with correct FLIT framing, is sent in place of a corrupted or faulty packet. The corrupted packet was part of a plurality of data packets that form a request transaction from the initiator IP. The initiator IP is expecting a response to the request, which included the corrupted packet. However, the corrupted packet and, hence the reaming data packet in the request transaction, is never sent to the target IP.

Instead the replacement packet, or a plurality of transaction packets, was sent and the isolation unit 800 terminated the remaining data packets in the request transaction. Therefore, there is no response coming back from the target IP. In order to drain and flush the faulty packet, as well as all the remaining packets that came after the corrupted data packet, and reset the system, a replacement response packet, or a plurality of replacement response packets, may be generated. The term "drain" or "draining" as used herein means generating packets to finish the pending or ongoing transaction so that the system is not suspended downstream. The term "flush" or "flushing" as used herein means waiting for any pending packet or pending response packets and generating any needed replacement response packet so that the system is not suspended upstream. The isolation unit 800 handles flushing the system by generating the replacement response packets to send to the initiator IP.

The FSM unit 900 communicates with the gate unit 902 when the fault signal is received. The gate unit 902 then generates a replacement response packet, or plurality of packets, that is sent to the initiator IP. The replacement response packet is sent in place of the expected response packet, which would have come from the target IP if an actual uncorrupted packet was sent to the target IP. The replacement response packets are sent from the isolation unit 800 to the initiator IP to terminate the transaction and prepare the INIU, the duplicate INIU, and related IP for reset.

After the isolation unit 800 drains and flushes the corrupted packet, and all the packets of the transaction that arrive from the initiator IP at the isolation unit 800, the isolation unit 800 sends an OK-to-RESET signal to the safety handler 806. The safety handler 806, then sends a reset signal to the initiator IP to reset the isolated NIUs and IPs, which were placed in a reset domain, and resume normal operation.

Figure 10:
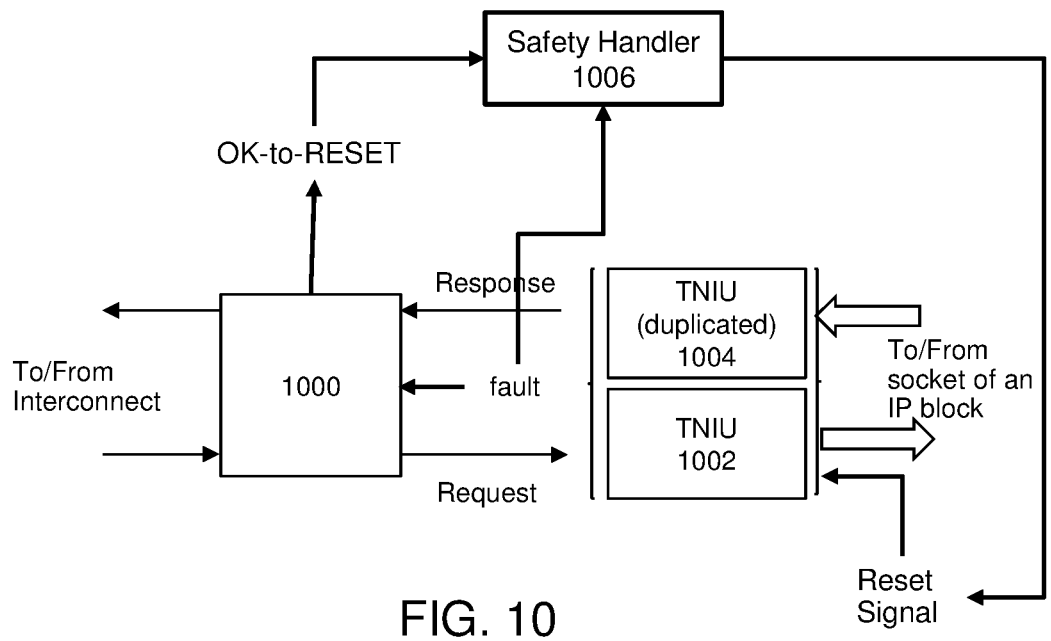
FIG. 10 shows a block diagram showing the network interface of a target IP in accordance with the various aspects and embodiments of the invention.

Referring now to FIG. 10, isolation logic of an isolation unit 1000 is positioned between a target IP, a duplicate target IP, and an interconnect or network transport. The isolation unit 1000 receives and sends transactions to the target IP through a target network interface unit (TNIU) 1002. The isolation unit 1000 receives and sends transactions to a duplicate target IP through a duplicate TNIU 1004. The isolation unit 1000 also receives a fault signal, the detection of the fault and generation of the fault signal is outline above for a resilient system. When a fault or an error is detected, the fault signal is sent to the isolation unit 1000 and a safety handler unit 1006. The isolation unit 1000, upon receiving the fault signal, isolates the NIUs 1002 and 1004 and the fault or corrupted data packet to prevent propagation of the fault throughout the system. In isolation mode, the isolation unit 1000 handles the fault or corrupted data packets. Once the isolation unit 1000 properly terminates or handles the fault, the isolation unit 1000 sends an OK-to-RESET signal to the safety handler unit 1006. The safety handler unit 1006 sends a reset signal to the initiator IP and the duplicate initiator IP, which includes the respective NIU, to reset and resume operation. In accordance with some embodiments, a handshake protocol is used to restart the NIUs, the target IP and/or the duplicate target IP.

Figure 11:
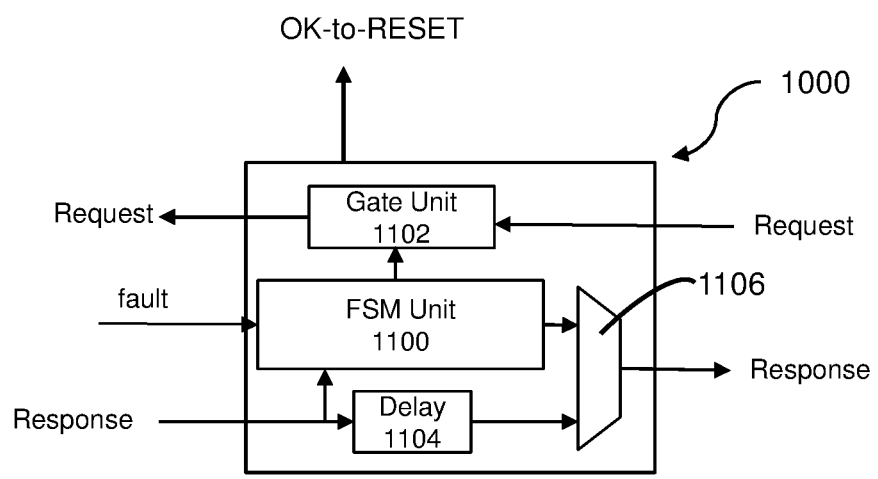
FIG. 11 shows a block diagram showing an isolation unit of FIG. 10 in accordance with the various aspects and embodiments of the invention.

Referring now to FIG. 11, the isolation unit 1000 of FIG. 10 is shown in greater detail in accordance with various aspects of the invention. The operation of the isolation unit 1000 is similar to the operation of the isolation unit 800. The isolation unit 1000 includes a packet tracking and terminating FLIT State Machine (FSM) unit 1100, a gate unit 1102, a delay unit 1104, and a multiplexing (MUX) unit 1106. All incoming responses are delayed by the delay unit 1104. The duration of the delay can be any number of clock cycles, from 0 or n. The duration of the delay is the time needed for the fault signal to reach the isolation unit. Typically, the duration of the delay is about one clock cycle. However, the time delay may be longer or shorter, in accordance with the aspects and embodiments of the invention. The delay unit 1104 includes a buffer for storing data packets while the data packets are delayed. If no fault signal is received within the delay period, then the stored data packets are uncorrupted or healthy data packets that can be passed or sent. The healthy packets are released or sent from the buffer of the delay unit 1104 to the MUX 1106. At the MUX 1106, the packets are sent out from the isolation unit 1000. The isolation unit 1000 passes the uncorrupted data packet downstream because there is no fault.

If a fault signal is received, within the delay period, at the FSM unit 1100, then the isolation unit 1000 begins isolation mode by isolating the TNIU and the corrupted data packet. In isolation mode, the isolation unit 1000 terminates the faulty packet and does not pass it downstream. The FSM unit 1100 replaces the terminated packet with a replacement packet. The replacement packet is similar to the faulty packet, as noted above. The replacement packet allows the system to continue operation and avoid waiting for the corrupted packet to arrive. The FSM unit 1100 sends the replacement packet to the MUX unit 1106. The delay unit 1104 sends the faulty packet to the MUX 1106. The MUX 1106 selects the replacement packet to send and prevents passing of the corrupted packet. The replacement packet is sent from the isolation unit 1000 downstream.

The replacement packet, with correct FLIT framing, is sent in place of a corrupted packet from the isolation unit 1000. The corrupted packet was part of a plurality of data packets that form a response transaction from the target IP. Thus, the initiator IP, which is at the other end, is expecting a complete response to the request. However, part of the response included the corrupted data packet. However, the corrupted packet and, hence the following data packet in the response transaction, is never sent from the target IP. Instead the replacement packet, or a plurality of replacement packets, are sent and the isolation unit 1000 terminates the remaining data packets in the response transaction. Therefore, there is no response coming back from the target IP to the initiator IP. In order to drain and flush the faulty packet, as well as all the remaining packets that came after the corrupted data packet, and reset the system, a replacement response packet, or a plurality of replacement response packets, are generated. The isolation unit 1000 handles draining and flushing the system by generating the replacement packets to send from the target IP.

The FSM unit 1100 communicates with the gate unit 1102 when the fault signal is received. The gate unit 1102 then generates a replacement packet, or plurality of packets, that is sent to the initiator IP. The replacement packet is sent in place of the packet, which would have come from the target IP if an actual uncorrupted packet originated at the target IP. The replacement packets are sent from the isolation unit 1000 to terminate the transaction and prepare the TNIU, the duplicate TNIU, and related target IP for reset.

After the isolation unit 1000 drains and flushes the corrupted packet, and all the packets of the transaction that arrive from the target IP at the isolation unit 1000, the isolation unit 1000 sends an OK-to-RESET signal to the safety handler 1006. The safety handler 1006, then sends a reset signal to reset the isolated TNIUs and related IP blocks, which were placed in a reset domain, and resumes normal operation.

Figure 12:
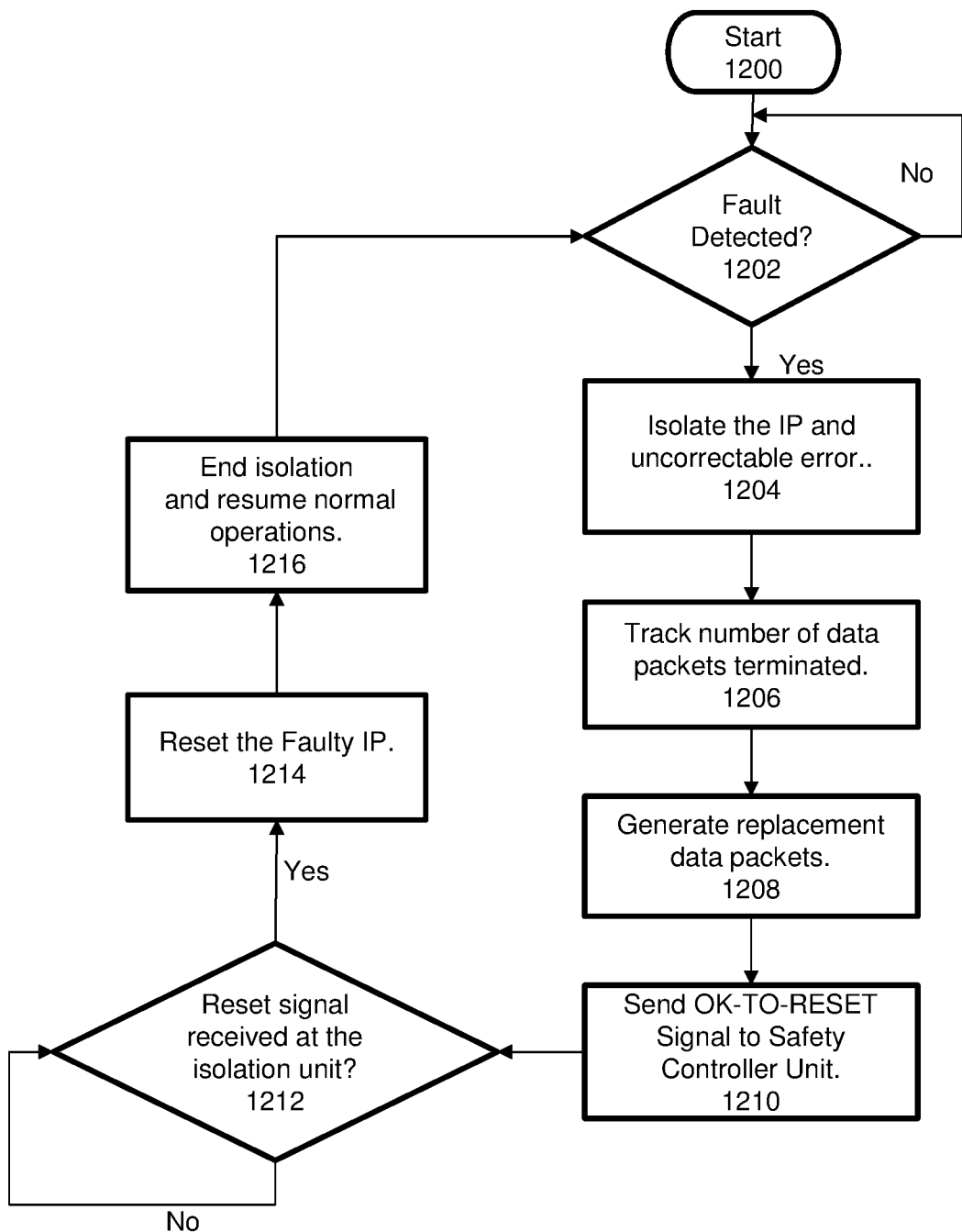
FIG. 12 shows a process for isolation of a fault and resetting an Intellectual Property (IP) in accordance with the various aspects and embodiments of the invention.

Referring now to FIG. 12, the process for starting isolation mode after a fault is detected begin at step 1200 in accordance with various aspects of the invention. The process is executed by isolation logic of an isolation unit, as discussed above. In accordance with various aspects of the invention, during the design process for the system or the network interconnect, isolation logic for the isolation unit can be included or inserted, manually or automatically, at the network transport or the interconnect level. The isolation logic can be inserted just before or just after NIUs. The isolation logic is not a power disconnect logic; is can be dedicated to transport, IP block, or NIU isolation in case of faults.

At step 1202 the isolation logic determine is a fault signal has been detected. IF not, then operation resumes as normal and the isolation unit (used interchangeable with the term "isolation logic") continues to monitor for a fault signal. If a fault signal is detected, then at step 1204 then the isolation unit enters isolation mode. The IP, including the NIU, and the uncorrectable error (used interchangeably with corrupted data packet) are isolated. When a fault is detected, the process drops the faulty FLIT or data packet. The NIU is isolated from the rest of the transport. At step 1206, the process terminates the corrupted data packet. This includes correct framing if faulty FLIT was after header FLIT. At step 1208, the isolation logic generates replacement data packets. The isolation logic handles any new incoming packets to flush the network and remove traffic from/to the isolated NIU or IP block. For example, requests may be returned in error and responses are dropped. At step 1210, the isolation unit provides handshake signaling, such as OK-to-RESET, once the corrupted packet and the related transaction are handled by the isolation unit. The system is ready to return to normal operation. The isolation unit monitors for a reset signal from the safety handler. IF the reset signal is not sent, then the isolation unit remains in isolation mode. IF the reset signal is received, then the isolated NIU and related IP, which units where isolated units that were put in a separate reset domain. are reset. At step 1216, the NIU, and related IP block, are back on line and normal operation resumes.

Figure 13:
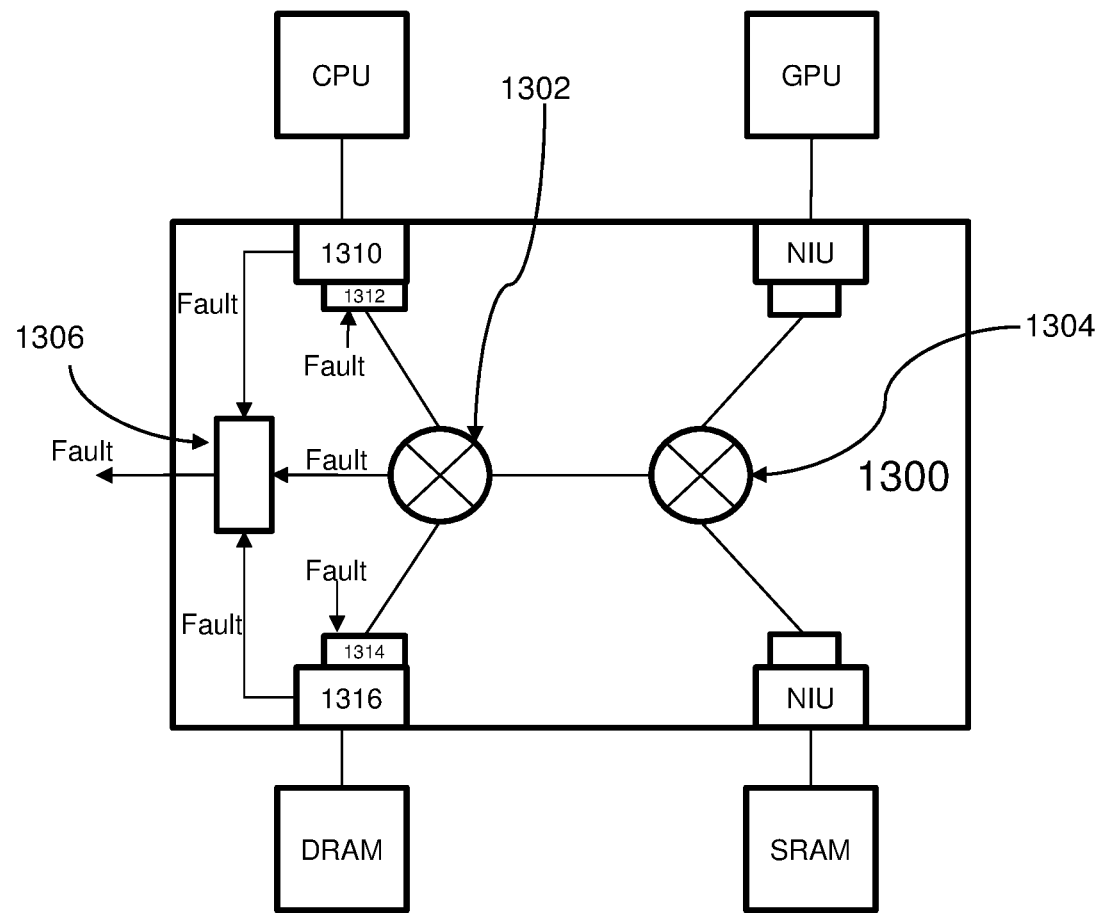
FIG. 13 shows an interconnect with isolation at the interface in accordance with the various aspects and embodiments of the invention.

Referring now to FIG. 13, an interconnect or transport network 1300 is shown in accordance with one aspect of the invention. The interconnect 1300 communicated various IP blocks, such as a CPU, a GPU, a DRAM, and an SRAM. The interconnect 1300 includes switch 1302 and switch 1304. In accordance with various aspects and embodiments of the invention, the switch 1302 includes isolation logic at all interfaces or communication links, to allow isolation of the switch 1302 upon fault detection. In accordance with various aspects and embodiments of the invention, the switch 1304 includes isolation logic for similar reasons. The switch 1302 communicated with switch 1304. The switch 1302 is also in communication with a logic unit 1306. In accordance with various aspects and embodiments of the invention, the logic unit 1306 can be the safety handler. In accordance other aspects and embodiments of the invention, the login unit 1306 is in in communication with a safety handler that is logically located outside of the interconnect 1300. Looking at a portion of the interconnect 1300, the CPU communicates with the DRAM through the CPU's NIU 1310 and an isolation unit 1312, the switch 1302, and the DRAM's isolation unit 1314 and corresponding NIU 1316. In accordance with various aspects and embodiments of the invention, the interconnect 1300 is part of a resilient system with duplicate IP blocks. Thus, fault signals are sent to the unit 1306 from the NIU 1310, the NIU 1316 and the switch 1302. Any portion of the interconnect 1300 can be isolated using the isolation logic, when a fault is detected. In accordance with various aspects and embodiments of the invention, all portions of the interconnect 1300 can be simultaneously by sending a fault signal to the respective isolation units. Thus, any portion of the interconnect 1300 can be isolated using the isolation logic of that corresponding NIU. The operation of the isolation, in accordance with the aspects and embodiments of the invention, is outline above.

Figure 14:
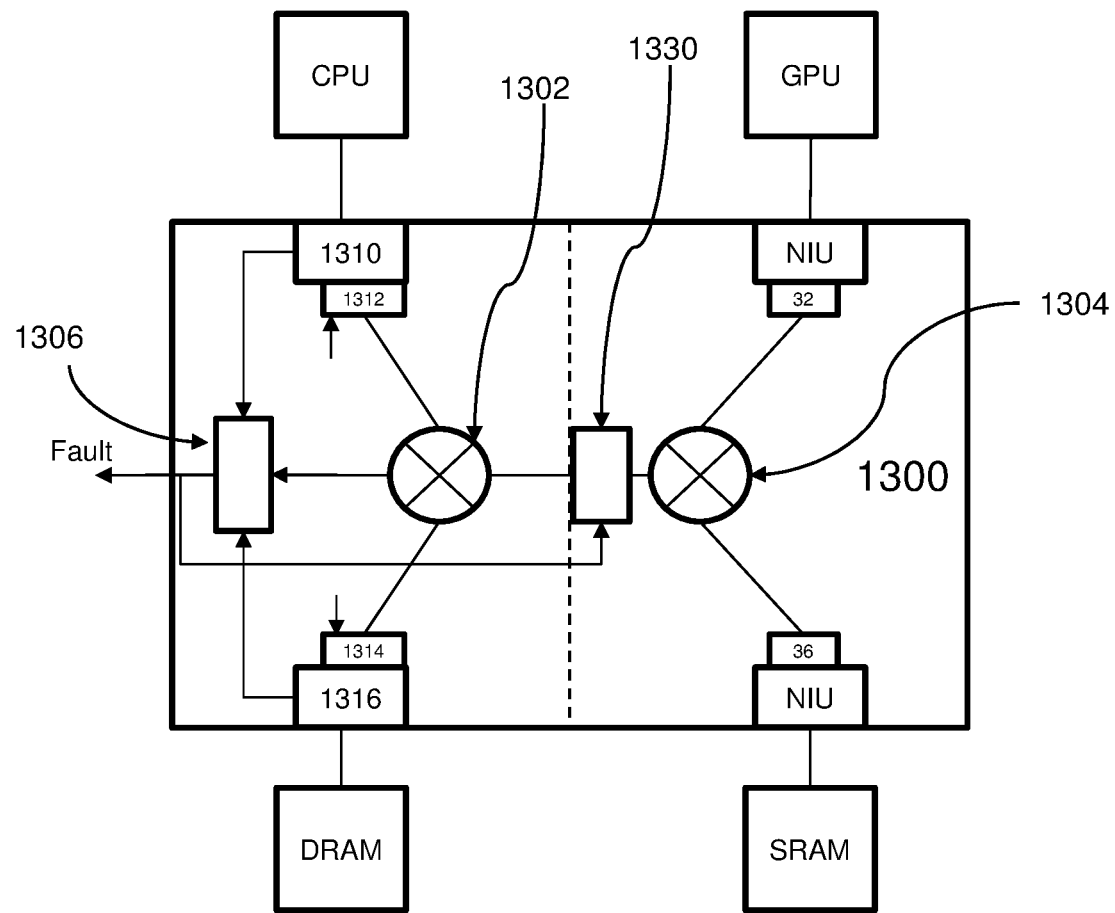
FIG. 14 shows an interconnect with an isolation unit within the interconnect to allow isolation of a fault within one portion of the interconnect in accordance with the various aspects and embodiments of the invention.

Referring now to FIG. 14, in accordance with various aspects and embodiments of the invention, the interconnect 1300 is shown and includes an isolation unit 1330 position between the switch 1302 and the switch 1304. The interconnect 1300 is shown divided into sides using the dash lines. The isolation unit 1330 receives a fault signal from the login unit 1306. The fault signal, at the isolation unit 1330, will result in isolating communication from the switch 1302 to the switch 1304. In this way, any error that occurs on the side of the interconnect 1300 can be isolated from the other side of the interconnect 1300. Operation of the isolation unit 1330 is similar to that already outlined above.

Figure 15:
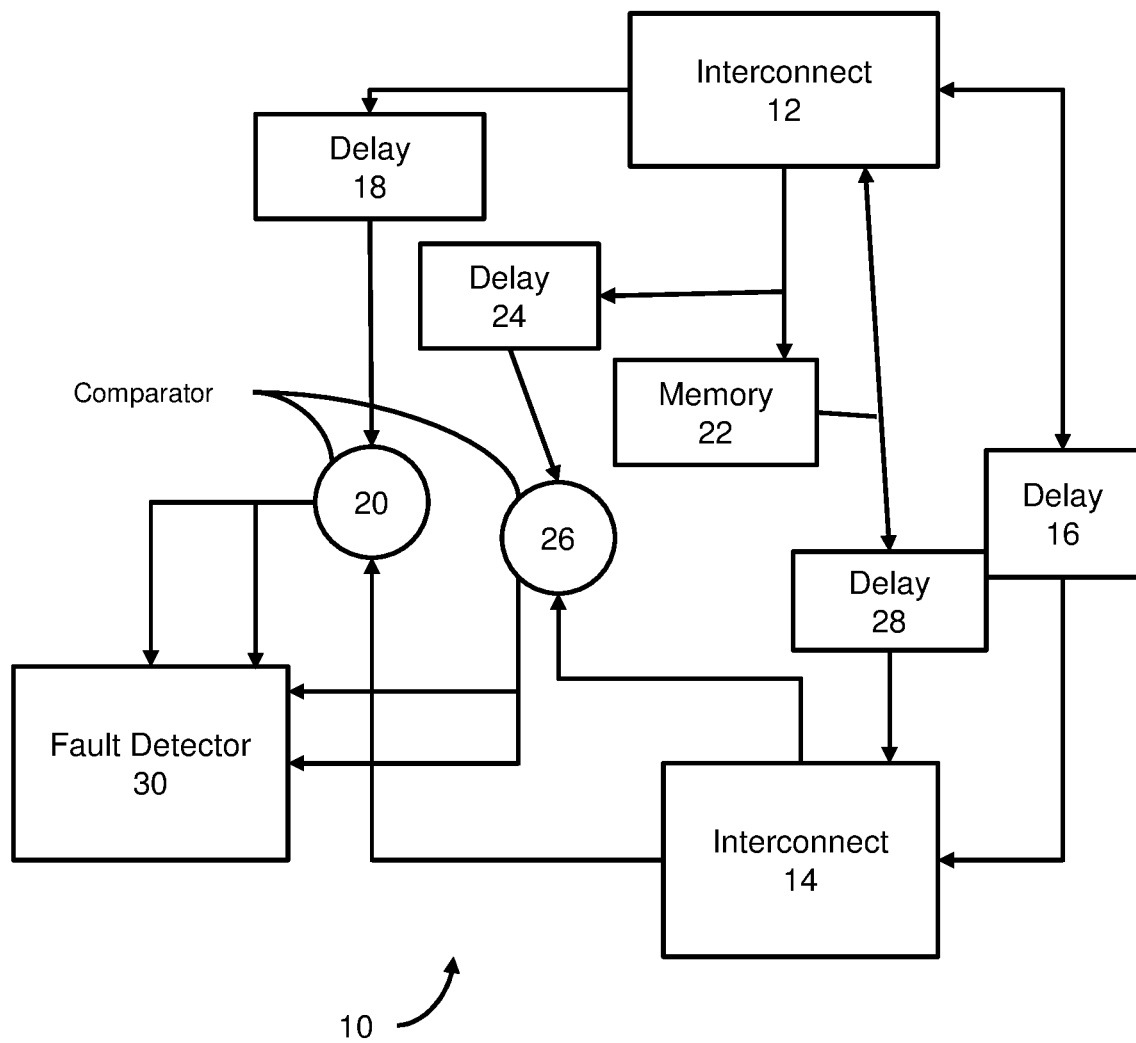
FIG. 15 shows an embodiment of a system in accordance with the various aspects and embodiments of the invention.

Referring now to FIG. 15, a system 10 is shown with a functional coherent interconnect 12 and a duplicate or checker coherent interconnect 14, which are in lock-step in accordance with some aspects of the invention. The functional coherent interconnect 12 receives a request. After one or more clock cycle delay caused by a delay unit 16, the inputs to the functional coherent interconnect are applied to the checker coherent interconnect 14. As used herein, the delay unit each cause a one or more cycle delay to each input signal into the functional coherent interconnect. The functional coherent interconnect 12 and a checker coherent interconnect 14 each receive the same incoming request and process the request in lock-step. All the outputs of the functional coherent interconnect 12 is sent to a delay unit 18 and then to a comparator 20. As used herein, the delay unit 18 apply the same delay as the unit 16. The output of the checker coherent interconnect 14 is already delayed by one or multiple clock-cycles and, hence, can be sent directly to the comparator 20.

In one embodiment of this invention, the functional coherent interconnect 12 is in communication with local memory 22, such as one or multiple SRAM. An output of the functional coherent interconnect 12 is sent to the memory 22 and to a delay unit 24 and a comparator 26. The output from the memory 22 is sent to the functional coherent interconnect 12 and to a delay unit 28 and to the checker coherent interconnect 14 after a delay of one or more clock cycle. The delay units 16, 18, 24 and 28 are all delaying their input signals by the same number of clock cycle, which can be one, or more. The output of the checker coherent interconnect 14 is already delayed by one or more clock cycle and, thus us sent directly to the comparator 26. The output from each comparator 20 and comparator 26 are sent to a fault detection unit 30. The fault detection unit 30 can determine if there were any errors or faults in the functional coherent interconnect 12's outputs and proceed accordingly. In accordance with some aspects of the invention, the fault detector 30 alerts system 10 that a fault has occurred and the system 10 can address or correct the error.

In operation, the driver of an input port of the functional coherent interconnect 12 is also used to drive the same input port of the checker coherent interconnect 14 at least one clock cycle later through the delay units 16 and 28, as noted above. The output port of the functional coherent interconnect 12 is delayed at least one clock cycle, through the delay units 18 and 24, and sent to the comparators 20 and 26 while the output port of the checker coherent interconnect is sent to the comparators 20 and 26.

The comparators 20 and 26 compares all the outputs of functional coherent interconnect 12, delayed by at least one clock cycle, with all the outputs of the checker coherent interconnect 14. The comparators 20 and 26 determine if the output of the functional coherent interconnect 12, after the delay, is the same as the output of the checker coherent interconnect 14. Thus, the comparators 20 and 26 determine if an error has occurred based on if a mismatch is found.

Figure 16:
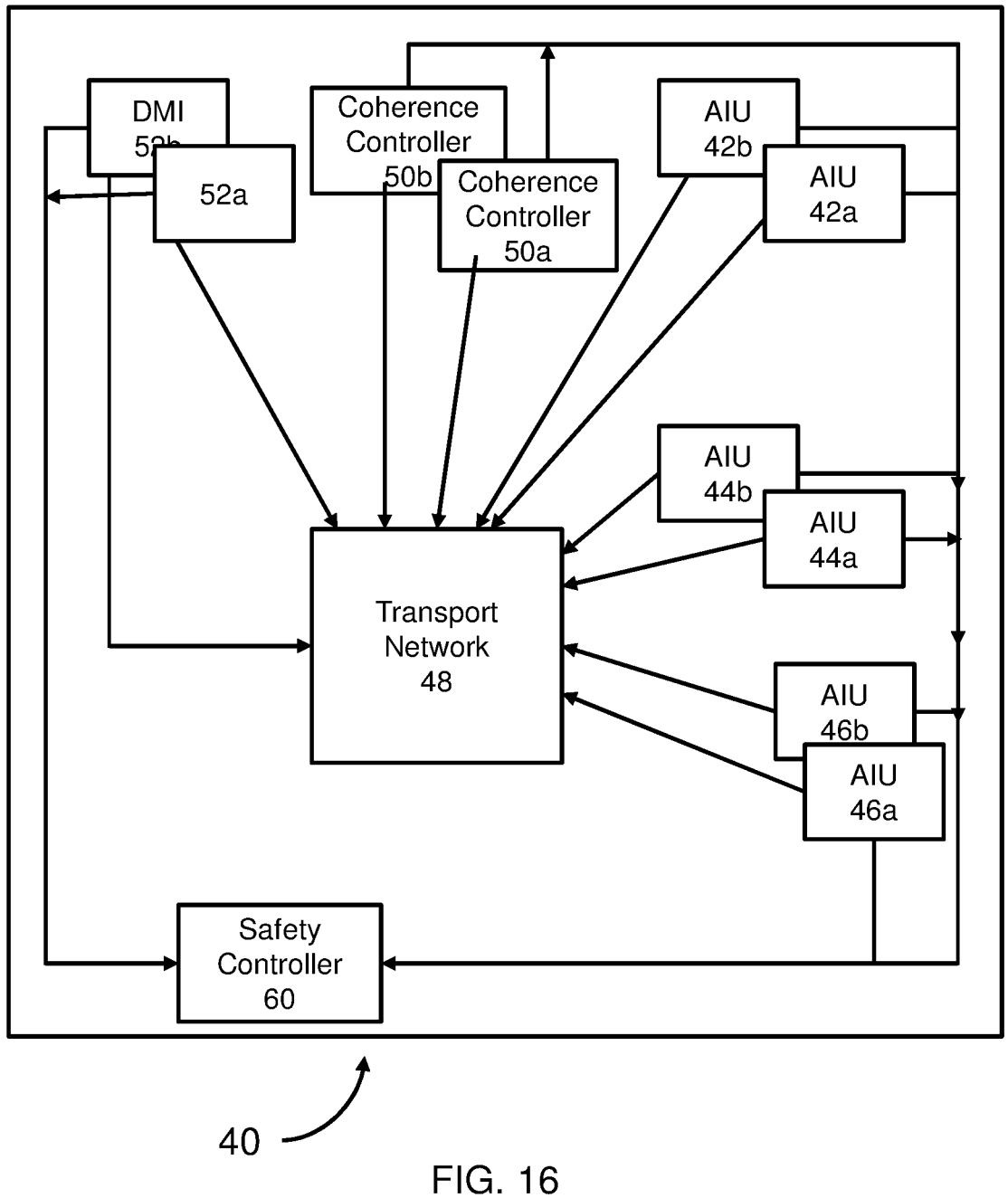
FIG. 16 shows an embodiment of a coherent interface in accordance with the various aspects and embodiments of the invention.

Referring now to FIG. 16 a coherent interconnect 40 is shown in accordance with various aspects of the invention. In accordance with some aspects of the invention and some embodiments, the coherent interconnect is divided into a set of functional units and a transport network. The set of functional units further comprise logic functions and the functional units can contain local memory. The functional units are replicated in the coherent interconnect and the local memory and the transport network is not. In accordance with the various aspects of the invention, the transport network handles communication between functional units and each functional unit is duplicated; one of the units is labelled "functional" and the other unit is labelled "checker." For example, the system 40 includes replication of the Agent Interface Unit (AIU), such that a functional AIU 42a is replicated by a checker AIU 42b, a functional AIU 44a and a checker AIU 44b, a functional AIU 46a and a checker AIU 46b, all of which share a common transport network 48. The interconnect 40 also includes a functional coherence controller 50a with a checker coherence controller 50b. Other examples of duplication for checking is a functional DMI 52a and a checker DMI 52b. The interconnect 40 also includes a safety controller 60 that is connected to each of the functional units and the checker units.

According to the various aspects of the invention, a comparator, which compares at least two inputs, is in communication with the functional interconnect units and the checker interconnect units, such as AIU 42a (functional) and AIU 42b (checker). Each driver of an input port of the functional interconnect unit, is also used to drive the same input port of the checker interconnect unit after a delay of at least one clock cycle. Each output port of the functional interconnect unit is delayed by at least one clock cycle and sent to the comparator, as discussed with respect to FIG. 15.

The same output port of the checker interconnect unit is sent to the comparator. The comparator compares all the outputs of all functional interconnect units, after the delay of at least one clock cycle, with the corresponding outputs of all the checker interconnect units to determine if the output of the functional interconnect units is the same as the output of the checker interconnect unit, in order to determine if an error has occurred, which is indicated when a mismatch is found. When a mismatch is found, the safety controller 60 reports the error to the system 40 and the system can take further action to mitigate the consequences of the error.

In accordance with various aspects of the invention, each cache line consists of 64 bytes. Therefore, address bits 6 and above choose a cache line. In accordance with some aspects of the invention and this embodiment, each cache line address range is mapped to an alternating coherence controller. Alternating ranges of two cache lines are mapped to different memory interfaces. Therefore, requests for addresses from 0x0 to 0x3F go to coherence controller (CC) 0 and addresses from 0x40 to 0x7F go to CC 1. If either of those coherence controllers fails to find the requested line in a coherent cache, a request for the line is sent to memory interface (MI) 0. Likewise, requests for addresses from 0x80 to 0xBF go to CC 0 and addresses from 0xC0 to 0xFF go to CC 1. If either of those coherence controllers fails to find the requested line in a coherent cache, a request for the line is sent to MI 1.

The ranges of values provided above do not limit the scope of the present invention. It is understood that each intervening value, between the upper and lower limit of that range and any other stated or intervening value in that stated range, is encompassed within the scope of the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

In accordance with various aspects and some embodiments of the invention, the address hashing function for coherence controllers and the address hashing function for memory interface units is the same. In such a case, there is necessarily a one-to-one relationship between the presence of coherence controllers and memory interface units, and each coherence controller is effectively exclusively paired with a memory interface unit. Such pairing can be advantageous for some system physical layouts, though does not require a direct attachment or any particular physical location of memory interface units relative to coherence controllers. In some embodiments, the hashing functions for coherence controllers are different from that of memory interface units, but the hashing is such that a cache coherence controller unit is exclusively paired with a set of memory interface units or such that a number of coherence controllers are exclusively paired with a memory interface unit. For example, if there is 2-way interleaving to coherence controller units and 4-way interleaving to memory interface units, such that pairs of memory interface units each never get traffic from one coherence controller unit, then there are two separate hashing functions, but exclusive pairing.

In accordance with various aspects and some embodiments of the invention, logical connectivity exists between all units, except for connectivity between coherence controllers and except for connectivity between memory interface units. This high degree of connectivity may be advantageous in some systems for minimizing latency. Such a configuration, with three agent interface (AI) units, two coherence controllers (CC), and two memory interface (MI) units. In such a configuration, one possible method of operation for a read memory request is as follows:

1. Agent interface units send read requests to coherence controllers.
2. Coherence controllers send snoops to as many agent interface units as necessary.
3. Agent interface units snoop their agents and send snoop responses to coherence controllers and, if the cache line is present in the agent cache, send the cache line to the requesting agent interface unit.
4. If a requested cache line is not found in an agent cache then the coherence controller sends a request to the memory interface unit.
5. The memory interface unit accesses memory, and responds directly to the requesting agent interface unit.

A possible method of operation for a write memory request is as follows:

1. Agent interface units send write requests to coherence controllers.
2. Coherence controllers send snoops to as many agent interface units as necessary.
3. Agent interface units snoop their agents and cause evictions and write accesses to memory or, alternatively, forwarding of data to the requesting agent interface unit.

In some embodiments data writes are issued from a requesting agent interface unit directly to destination memory interface units. The agent interface unit is aware of the address interleaving of multiple memory interface units. In alternative embodiments, data writes are issued before, simultaneously with, or after coherent write commands are issued to coherence controllers. In some embodiments, the requesting agent interface unit receives cache lines from other AIUs, and merges cache line data with the data from its agent before issuing cache line writes to memory interface units.

Other embodiments may have advantages in physical layout by having less connectivity. In accordance with various aspects and some embodiments of the invention, there is no connectivity between coherence controllers and memory interfaces. Such an embodiment requires that if the requested line is not found in an agent cache, the coherence controller responds as such to the requesting agent interface unit, which then initiates a request to an appropriate memory interface unit. In accordance with various aspects of the invention, the connectivity of another configuration is changed so that memory interface units respond to coherence controllers, which in turn respond to agent interface units.

In accordance with various aspects of the invention, with a one-to-one pairing between coherence controllers and memory interface units such that each need no connectivity to other counterpart units. In accordance with various aspects and some embodiments of the invention, the connectivity of a very basic configuration is each agent interface unit is coupled exclusively with a single coherence controller, which is coupled with a single memory interface unit.

The physical implementation of the transport network topology is an implementation choice, and need not directly correspond to the logical connectivity. The transport network can be, and typically is, configured based on the physical layout of the system. Various embodiments have different multiplexing of links to and from units into shared links and different topologies of network switches.

System-on-chip (SoC) designs can embody cache coherent systems according to the invention. Such SoCs are designed using models written as code in a hardware description language. A cache coherent system and the units that it comprises, according to the invention, can be embodied by a description in hardware description language code stored in a non-transitory computer readable medium.

Many SoC designers use software tools to configure the coherent system and its transport network and generate such hardware descriptions. Such software runs on a computer, or more than one computer in communication with each other, such as through the Internet or a private network. Such software is embodied as code that, when executed by one or more computers causes a computer to generate the hardware description in register transfer level (RTL) language code, the code being stored in a non-transitory computer-readable medium. Coherent system configuration software provides the user a way to configure the number of agent interface units, coherence controllers, and memory interface units; as well as features of each of those units. Some embodiments also allow the user to configure the network topology and other aspects of the transport network. Some embodiments use algorithms, such as ones that use graph theory and formal proofs, to generate a topology network. Some embodiments allow the user to configure a unit's duplication and safety controller existence.

Some typical steps for manufacturing chips from hardware description language descriptions include verification, synthesis, place & route, tape-out, mask creation, photolithography, wafer production, and packaging. As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

Another benefit of the separation of functional units, according to the invention, is that intermediate units can be used for monitoring and controlling a system. For example, some embodiments of the invention include a probe unit within the transport network between one or more agent interface units and the other units to which it is coupled. Different embodiments of probes perform different functions, such as monitoring bandwidth and counting events. Probes can be placed at any point in the transport network topology.

The invention can be embodied in a physical separation of logic gates into different regions of a chip floorplan. The actual placement of the gates of individual, physically separate units might be partially mixed, depending on the floorplan layout of the chip, but the invention is embodied in a chip in which a substantial bulk of the gates of each of a plurality of units is noticeably distinct within the chip floorplan.

The invention can be embodied in a logical separation of functionality into units. Units for agent interface units, coherence controller units, and memory interface units may have direct point-to-point interfaces. Units may contain a local memory such as SRAM. Alternatively, communication between units may be performed through a communication hub unit.

The invention, particularly in terms of its aspect of separation of function into units, is embodied in systems with different divisions of functionality. The invention can be embodied in a system where the functionality of one or more of the agent interface units, coherence controller units, and memory interface units are divided into sub-units, e.g. a coherence controller unit may be divided into a request serialization sub-unit and a snoop filter sub-unit. The invention can be embodied in a system where the functionality is combined into fewer types of units, e.g. the functionality from a coherence controller unit can be combined with the functionality of a memory interface unit. The invention can be embodied in a system of arbitrary divisions and combinations of sub-units.

Some embodiments of a cache coherent system according to the invention have certain functionality between an agent and its agent interface unit. The functionality separates coherent and non-coherent transactions. Non-coherent transactions are requested on an interface that is not part of the cache coherent system, and only coherent transactions are passed to the agent interface unit for communication to coherence controller units. In some embodiments, the function of separating coherent and non-coherent transactions is present within the agent interface unit.

In accordance with some aspects and some embodiments of the invention, one or more agent interface units communicate with IO-coherent agents, which themselves have no coherent caches, but require the ability to read and update memory in a manner that is coherent with respect to other coherent agents in the system using a direct means such as transaction type or attribute signaling to indicate that a transaction is coherent. In some aspects and embodiments, one or more agent interface units communicate with non-coherent agents, which themselves have no coherent caches, but require the ability to read and update memory that is coherent with respect to other coherent agents in the system using an indirect means such as address aliasing to indicate that a transaction is coherent. For both IO-coherent and non-coherent agents, the coupled agent interface units provide the ability for those agents to read and update memory in a manner that is coherent with respect to coherent agents in the system. By doing so, the agent interface units act as a bridge between non-coherent and coherent views of memory. Some IO-coherent and non-coherent agent interface units may include coherent caches on behalf of their agents. In some embodiments, a plurality of agents communicate with an agent interface unit by aggregating their traffic via a multiplexer, transport network or other means. In doing so, the agent interface unit provides the ability for the plurality of agents to read and update memory in a manner that is coherent with respect to coherent agents in the system. In some aspects and embodiments, different agent interface units communicate with their agents using different transaction protocols and adapt the different transaction protocols to a common transport protocol in order to carry all necessary semantics for all agents without exposing the particulars of each agent's interface protocol to other units within the system. Furthermore, in accordance with some aspects as captured in some embodiments, different agent interface units interact with their agents according to different cache coherence models, while adapting to a common model within the coherent system. By so doing, the agent interface unit is a translator that enables a system of heterogeneous caching agents to interact coherently.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention is not intended to be limited to the various aspects and embodiments discussed and described herein. Rather, the scope and spirit of invention is embodied by the appended claims.

What is claimed is:

1. An isolation unit in communication with an interconnect, the isolation unit receives a fault signal, which indicates a faulty packet, from a comparator and the isolation unit prevents propagation of an uncorrectable error through a system, the isolation unit comprising:
   a state machine;
   a gate unit in communication with the state machine;
   a delay unit in communication with the state machine, wherein the delay unit introduces a delay in a communication path; and
   a multiplexer unit in communication with the state machine,
   wherein the state machine receives the fault signal indicating a fault has occurred and the isolation unit prevents the fault from propagating through the system and the state machine generates a replacement packet as an output that replaces the faulty packet.

2. The isolation unit of claim 1 further comprising a buffer in communication with the state machine, wherein the buffer stores packets.

3. The isolation unit of claim 2, wherein the buffer stores packets when the isolation unit receives the fault signal.

4. The isolation unit of claim 1, wherein the state machine is a FLIT state machine.

5. The isolation unit of claim 1, wherein the fault signal indicates that the uncorrectable error originated outside of a network-on-chip (NoC).

6. The isolation unit of claim 1, wherein the fault signal indicates that the uncorrectable error originated inside the NoC.

7. The isolation unit of claim 1, wherein the isolation unit generates and sends a reset enable signal.

8. The isolation unit of claim 1, wherein the state machine sends a control signal to the gate unit to prevent packets from passing through the isolation unit.

9. The isolation unit of claim 1, wherein the isolation unit ends isolation mode to allow data propagation per normal mode of operation.

* * * * *